US010515095B2

(12) United States Patent
Childress et al.

(10) Patent No.: US 10,515,095 B2
(45) Date of Patent: Dec. 24, 2019

(54) DETECTING CLUSTERS AND RELATIONSHIPS IN LARGE DATA SETS

(71) Applicant: International Business Machines Corporation, Armonk, NY (US)

(72) Inventors: Shawnna M. Childress, Orlando, FL (US); Sudhakar Govindasamy, Lewisville, TX (US); Ahmed M. Nassar, Katy, TX (US); Craig M. Trim, Sylmar, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 201 days.

(21) Appl. No.: 15/285,659

(22) Filed: Oct. 5, 2016

(65) Prior Publication Data
US 2018/0096047 A1    Apr. 5, 2018

(51) Int. Cl.
*G06F 16/28* (2019.01)
*G06F 16/901* (2019.01)

(52) U.S. Cl.
CPC ........ *G06F 16/285* (2019.01); *G06F 16/9024* (2019.01)

(58) Field of Classification Search
CPC .......... G06F 17/30; G06F 17/16; G06F 17/40; G06F 17/30572; G06F 16/9024
See application file for complete search history.

(56) References Cited

U.S. PATENT DOCUMENTS

| 9,147,273 B1 | 9/2015 | Allen et al. | |
| 2002/0087275 A1* | 7/2002 | Kim | G16B 45/00 702/19 |
| 2015/0066929 A1 | 3/2015 | Satzke et al. | |
| 2015/0261833 A1* | 9/2015 | Blaas | G06F 17/30241 707/722 |
| 2015/0363644 A1* | 12/2015 | Wnuk | G06T 11/206 382/103 |

OTHER PUBLICATIONS

Van Schaik, Sebastiaan J. Answering reachability queries on large directed graphs. Diss. Department of Computing Sciences, Faculty of Science, Utrecht University, 2010. (Year: 2010).*

(Continued)

*Primary Examiner* — William Spieler
(74) *Attorney, Agent, or Firm* — Garg Law Firm, PLLC; Rakesh Garg; James Nock

(57) ABSTRACT

From a directional acyclic graph (DAG) corresponding to a data volume, a matrix of relationships of a first node and a second node is computed. The DAG includes a set of nodes and a set of directional edges, the set of nodes including the first node and the second node. An inverted matrix is computed from the matrix, which retains values in only those column positions where a value in a first row corresponding to the first node is opposite of a value in a second row corresponding to the second node. From the first row, a first cluster of nodes related to the first node is constructed by selecting nodes corresponding to those columns where the first row has a value indicating an affirmative relationship. Information representing the first cluster of nodes a second cluster of nodes are output.

18 Claims, 9 Drawing Sheets

(56) References Cited

OTHER PUBLICATIONS

Kornaropoulos, Evgenios M., and Ioannis G. Tollis. "DAGView: an approach for visualizing large graphs." International Symposium on Graph Drawing. Springer, Berlin, Heidelberg, 2012. (Year: 2012).*
Anonymous, Method and System for Detecting Faulty Nodes in Large-Scale Enterprise Systems, Dec. 14, 2010.
Anonymous, Method of scalable visualization for management of multidimentional systems, Jun. 10, 2010.
IBM, A Method and System of Clustering-based Entity Householding, Oct. 31, 2006.
Suzuki et al; Graph-based vectorization method for line patterns, Jun. 5-9, 1988.
Srinivasa et al; Vectorization of Structure to Index Graph Databases, Jan. 2003.
Wikipedia; Automatic vectorization, Aug. 13, 2016.

* cited by examiner

DETECTING CLUSTERS AND RELATIONSHIPS IN LARGE DATA SETS

TECHNICAL FIELD

The present invention relates generally to a method, system, and computer program product for analyzing large data sets. More particularly, the present invention relates to a method, system, and computer program product for detecting clusters and relationships in large data sets.

BACKGROUND

One of the problems facing Big Data analytics is the making sense of large volumes of seemingly disconnected data. For example, a social media platform has hundreds of millions of users, who generate petabytes of data per day. Search engines also process a comparable volume of data per day. Managing or consuming such vast amounts of data on an ongoing basis in a meaningful way is a very complex problem.

Another one of the problems facing Big Data analytics is making sense of such large volumes of data quickly. Given enough time and computing power, any volume of data can be analyzed to obtain the desired answers from the volume of data. But, given that the volume of data is not static, and given that unlimited time and computing resources are usually unavailable in a practical environment, the speed at which large volumes of data can be analyzed is a critical factor in harnessing the value of the data before the data becomes obsolete or an opportunity to use the data is lost.

SUMMARY

The illustrative embodiments provide a method, system, and computer program product. An embodiment includes a method that computes, from a directional acyclic graph (DAG) corresponding to a data volume, a matrix of relationships of a first node and a second node, the DAG comprising a set of nodes and a set of directional edges, the set of nodes including the first node and the second node. The embodiment computes, using a processor and a memory, an inverted matrix from the matrix, wherein the inverted matrix retains values in only those column positions where a value in a first row corresponding to the first node is opposite of a value in a second row corresponding to the second node. The embodiment constructs, from the first row, a first cluster of nodes related to the first node, by selecting nodes corresponding to those columns where the first row has a value indicating an affirmative relationship. The embodiment outputs information representing the first cluster of nodes related to the first node and information representing a second cluster of nodes related to the second node.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
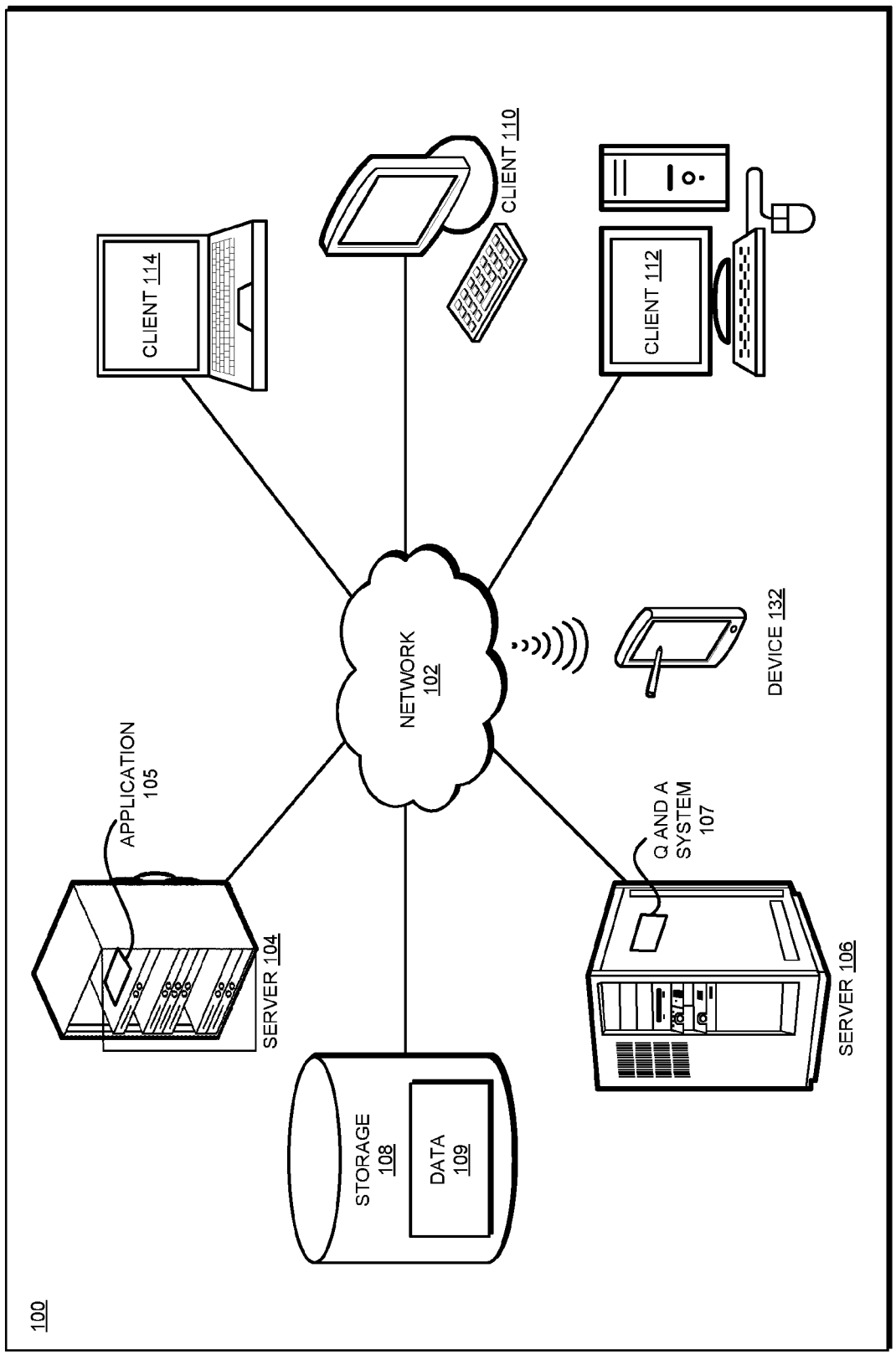
FIG. 1 depicts a block diagram of a network of data processing systems in which illustrative embodiments may be implemented.

The illustrative embodiments recognize that one of the problems in analyzing a volume of data is determining whether the individual units of data in the volume are somehow connected or related to each other. An individual unit of data can be a data point or single data value, or can be a smaller collection of data within the given volume. An individual unit of data is hereinafter interchangeably referred to as a "node".

For example, given an example volume of social media data comprising twenty million nodes, a beverage manufacturer might want to determine whether there is a relationship between consumers of the beverage they manufacture and people who watch certain television shows. Such a relationship is useful in deciding whether to buy advertising time during those shows, and what age-group to target in the advertising. However, if determining such a relationship takes an amount of computing resources that the advertiser does not have, or requires analysis that produces results after the show has already ended, the determination will have missed an opportunity to meaningfully leverage the volume of data.

Furthermore, there are systems that exist today, which can answer questions about a subject-matter domain given a corpus of data relating to the subject-matter domain. Such systems are called Questions and Answer Systems (Q and A systems). The illustrative embodiments recognize that the quality of answers provided by a Q and A system, or even the ability of a Q and A system to answer certain questions is highly dependent upon the quality of the corpus. Particularly, if the corpus can be preprocessed to provide the Q and A system with information on certain groupings or clusters of data that are present in the corpus, certain relationships that exist between the clusters of data in the corpus, and the precision of those relationships, the Q and A system's ability to answer questions related to the corpus will be greatly enhanced. Again, as with other uses of large volumes of data, the illustrative embodiments recognize that for the Q and A system to extract any benefit from such pre-processing, the pre-processing would have to be performable more efficiently than the presently available solutions allow.

The illustrative embodiments recognize that the presently available tools or solutions do not address these needs or provide adequate solutions for these needs. The illustrative embodiments used to describe the invention generally address and solve the above-described problems and other problems related to detecting clusters and relationships in large data sets.

An embodiment can be implemented as a software application. The application implementing an embodiment can be configured as a modification of an existing data analysis system, as a separate application that operates in conjunction with an existing data analysis system, a standalone application, or some combination thereof.

An embodiment constructs a graph from a given volume of data by connecting nodes of data with one another using directed edges. The graph is a Directed Acyclic Graph (DAG) that is constructed by finding all possible paths from one node in that graph to another using known techniques for graph construction. The DAG may take the form of a tree representation. A tree is always a DAG, but a DAG is not always a tree because a tree's branches are not allowed to join but only bifurcate, while a DAG's branches can flow together, so long as no cycles are introduced.

Visualizing the data as a graph is a first step in making it possible to see the connections between data. However, a graph that simply connects the nodes with edges is not very meaningful. Known 4GL solutions, such as SPARQL, Cypher or SQL, are inefficient and nearly intractable on massive graphs. For example, popular existing solutions such as Neo4J or Apache Jena are known not to scale for Big Data, such as for the example graph of twenty million nodes described above.

The illustrative embodiments provide an efficient methodology for computation of clusters, starting with single nodes in the graph. These initial single nodes can be any known starting point, such as at a node that has an attribute with a known value. For example, suppose that the non-limiting example data volume used to describe the operations of the various embodiments pertains to data nodes, which among other attributes, have an attribute that describes a type of mobile device used by a user associated with the node. Only as a simplified non-limiting example, assume that one possible value of the device attribute is "iPhone 6" and another possible value is "Nexus 6" (iPhone, iPhone 6, and Nexus 6 are trademarks of their respective owners).

The selection of the particular values of node attributes is only for the ease of the description of the various operations of the illustrative embodiments. Any node with any attribute, having any known value can similarly be selected to practice an embodiment. Furthermore, only two nodes with two known values of a single attribute are also not intended to be limiting on the illustrative embodiments. Any number of initial nodes having any number of attributes with any number of known values can be selected in an implementation within the scope of the illustrative embodiments.

An embodiment performs cluster computation in a way that is more computationally efficient than known 4GL solutions. While there are clustering techniques such as k-Means, that look for inherent clusters in labelled data, am embodiment begins differently from such solutions—starting with known individual attributes, and carving off sub-graphs that can be leveraged to create (or otherwise use) additional attributes that will be true for that node.

An embodiment further describes a technique, which is hereinafter referred to as Minimal Cluster Connection (MCC), for determining a precise relationship between the clusters of nodes. This technique is usable to connect sub-graphs using the most granular and applicable—i.e., most precise—relationship possible between the clusters. The sub-graphs can be clusters that are identified and created by an embodiment as described herein, or can be sub-graphs or clusters that are already known to exist in the data volume.

For example, iPhone 6 and Nexus 6 owners may be connected through other relationships, such as a common choice of beverage, or sports team preferences, which can be present in the graph. The MCC technique finds the relationship that is most precise and accurate for the given attributes being examined. In this case, iPhone 6 and Nexus 6 are both "devices", but that relationship is not as precise as being able to determine that iPhone 6 and Nexus 6 are related because they are both "Smartphone" meets that description. In other words, the "device" relationship would be accurate but not precise, and the "smartphone" relationship would be both accurate and relatively more precise than the "device" relationship.

Being able to identify clusters in data, and being able to define a relationship between clusters precisely according to the illustrative embodiments can assist Q and A systems in entity resolution. For example, given a volume of data, an embodiment helps the Q and A system answer questions, such as—"What does J_Doe_1 have in common with J_Doe_2 given X about J_Doe_1 (as an attribute value in a node corresponding to J_Doe_1) and given Y about J_Doe_2 (as an attribute value in a node corresponding to J_Doe_2)".

The manner of detecting clusters and relationships in large data sets described herein is unavailable in the presently available methods. A method of an embodiment described herein, when implemented to execute on a device or data processing system, comprises substantial advancement of the functionality of that device or data processing system in efficiently performing data analysis on large volumes of data.

The illustrative embodiments are described with respect to certain types of data, nodes, attributes, values, graphs, clusters, relationships, precision, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
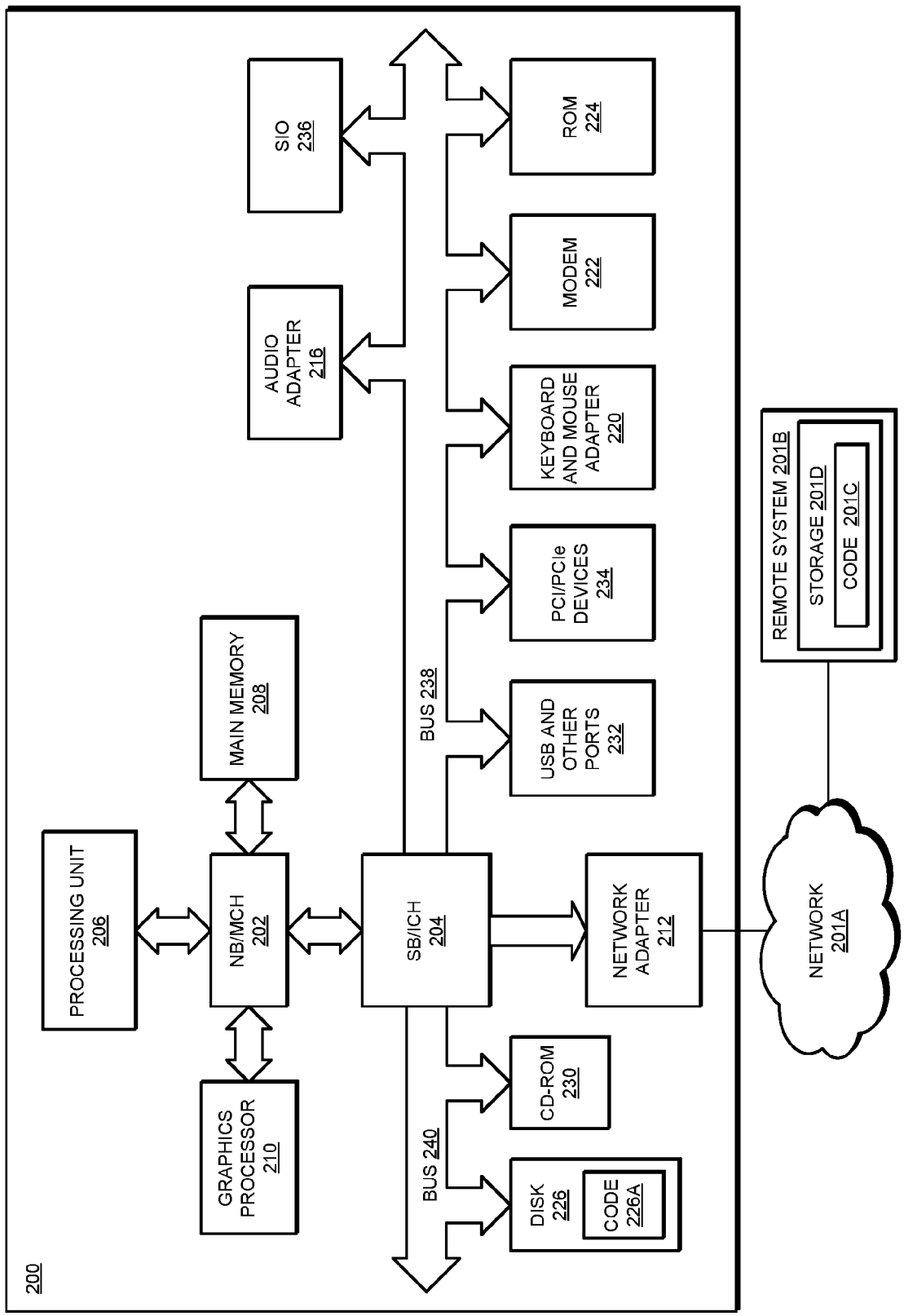
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Application 105 analyzes data 109, which is a volume of data to be analyzed, to detect clusters and precise relationships between the clusters in data 109 in a manner described herein. The detected clusters and relationships serve as inputs to Q and A system 107, which is configured to answer questions pertaining to data 109.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. In another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
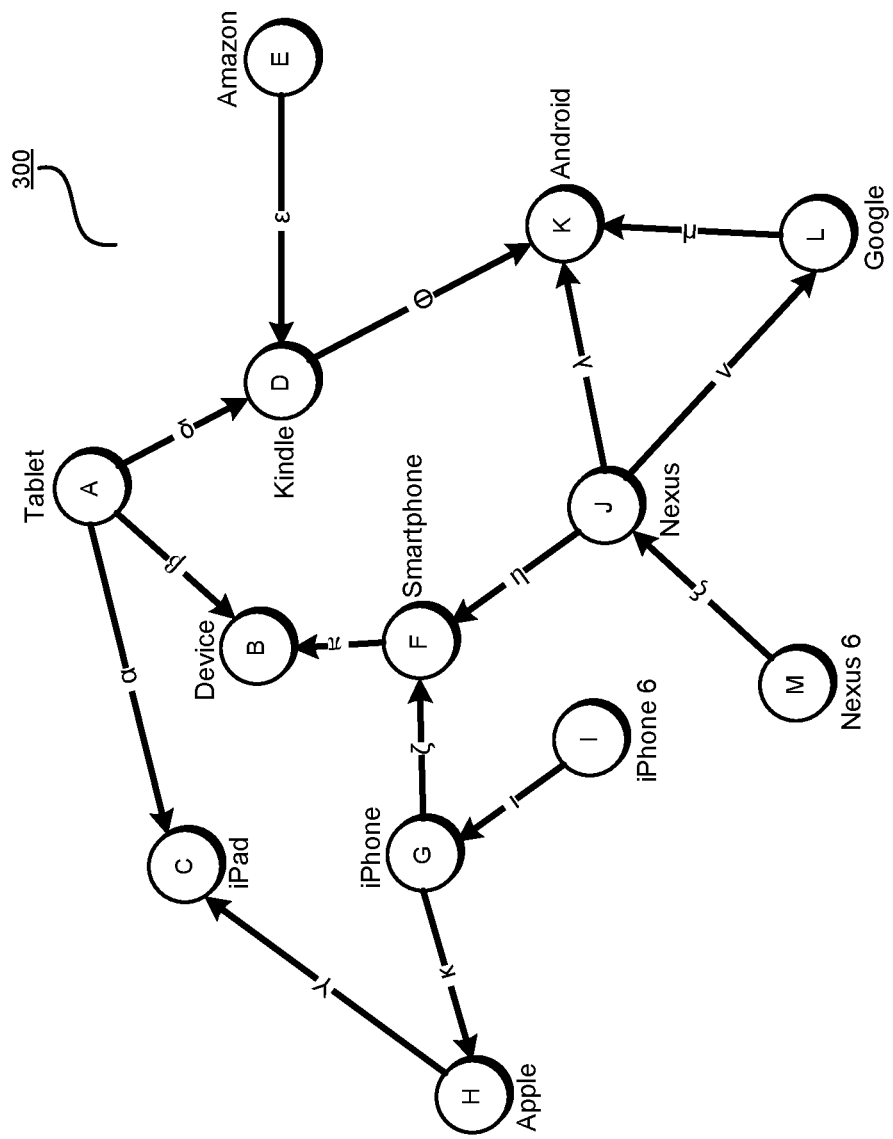
FIG. 3 depicts an example graph corresponding to an example volume of data for analysis in accordance with an illustrative embodiment.

With reference to FIG. 3, this figure depicts an example graph corresponding to an example volume of data for analysis in accordance with an illustrative embodiment. The nodes in graph 300, which is a DAG, are labeled using uppercase English alpha characters. The initial relationships between the nodes are labeled using lowercase Greek alpha characters. This labeling is done only as a non-limiting example, for the purpose of the clarity of the computations described herein. Any other suitable labeling can be similarly used in an implementation without departing the scope of the illustrative embodiments.

As an example, assume that nodes I and M are two initial nodes selected for the computation of clusters and relationships. Node I represents data about a person who own an iPhone 6 device, and node M represents data about a person who owns a Nexus 6 device. Note that any number of nodes can be selected within the scope of the illustrative embodiments, but the computations will then be performed using pairs of the selected nodes in different combinations of the nodes in the pairs.

It is helpful to remember that the graphs on which an embodiment can be used are typically measured in the millions of nodes, and have a high degree of edge complexity. Because a graph of such actual complexity cannot be conveniently depicted on a two-dimensional surface for the purpose of explanation here, a simpler non-limiting example graph has been chosen to describe the operations of the various embodiments. It should be noted that the application of this formula does result in non-trivial analyses output with a much higher degree of computational efficiency than the known alternatives.

One objective of the analysis according to an embodiment is to discover one or more clusters that are related to node I, and one or more clusters that are related to node M. Another objective of the analysis according to the embodiment is to discover one or more relationships between the discovered clusters relative to nodes I and M. Another objective of the analysis according to the embodiment is to discover, from the one or more relationships, the most precise relationship between the discovered clusters relative to nodes I and M.

Figure 4:
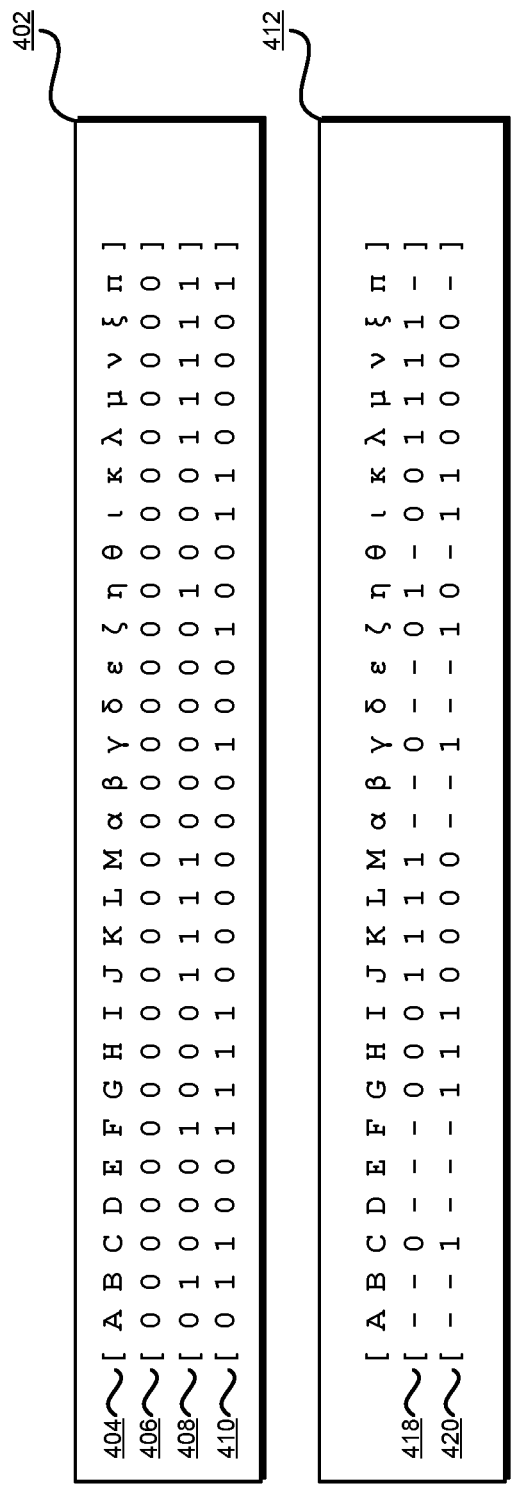
FIG. 4 depicts a next step in the analysis according to an illustrative embodiment.

With reference to FIG. 4, this figure depicts a next step in the analysis according to an illustrative embodiment. Matrix 402 is constructed from graph 300 in FIG. 3.

Note that row 404 is a header, and is included for visual purposes only. The header row can be omitted in an implementation or is otherwise discarded or disregarded in the computations described herein. The default representation is given in the row 406 of matrix 402. The relationships of node M are shown in row 408. For example, if another node or an edge is reachable in DAG 300 from node I, the value under the column of the other node or edge in row 408 is 1, otherwise 0. Similarly, the relationships of node I are shown in row 410. If another node or an edge is reachable in DAG 300 from node M, the value under the column of the other node or edge in row 410 is 1, otherwise 0.

Matrix 402 is reduced to matrix 412, which includes reduced rows 418 and 420. Row 408 in matrix 402 is reduced to row 418 in matrix 412, and row 410 in matrix 402 is reduced to row 420 in matrix 412. Assuming a binary matrix—because the matrix is built for a pair of nodes at a time, each column position in the rows 408 and 410 of matrix 402 is compared to find inverted values, i.e., where the value in row 408 is opposite of the value in row 410 in the same column.

According to this method, the column positions where rows 408 and 410 have the same value in matrix 402, matrix 412 gets no value (indicated by "–") in rows 418 and 420 in the same column position. Where rows 408 and 410 have different values in matrix 402, matrix 412 carries over the same values in rows 418 and 420 in the same column position.

Figure 5:
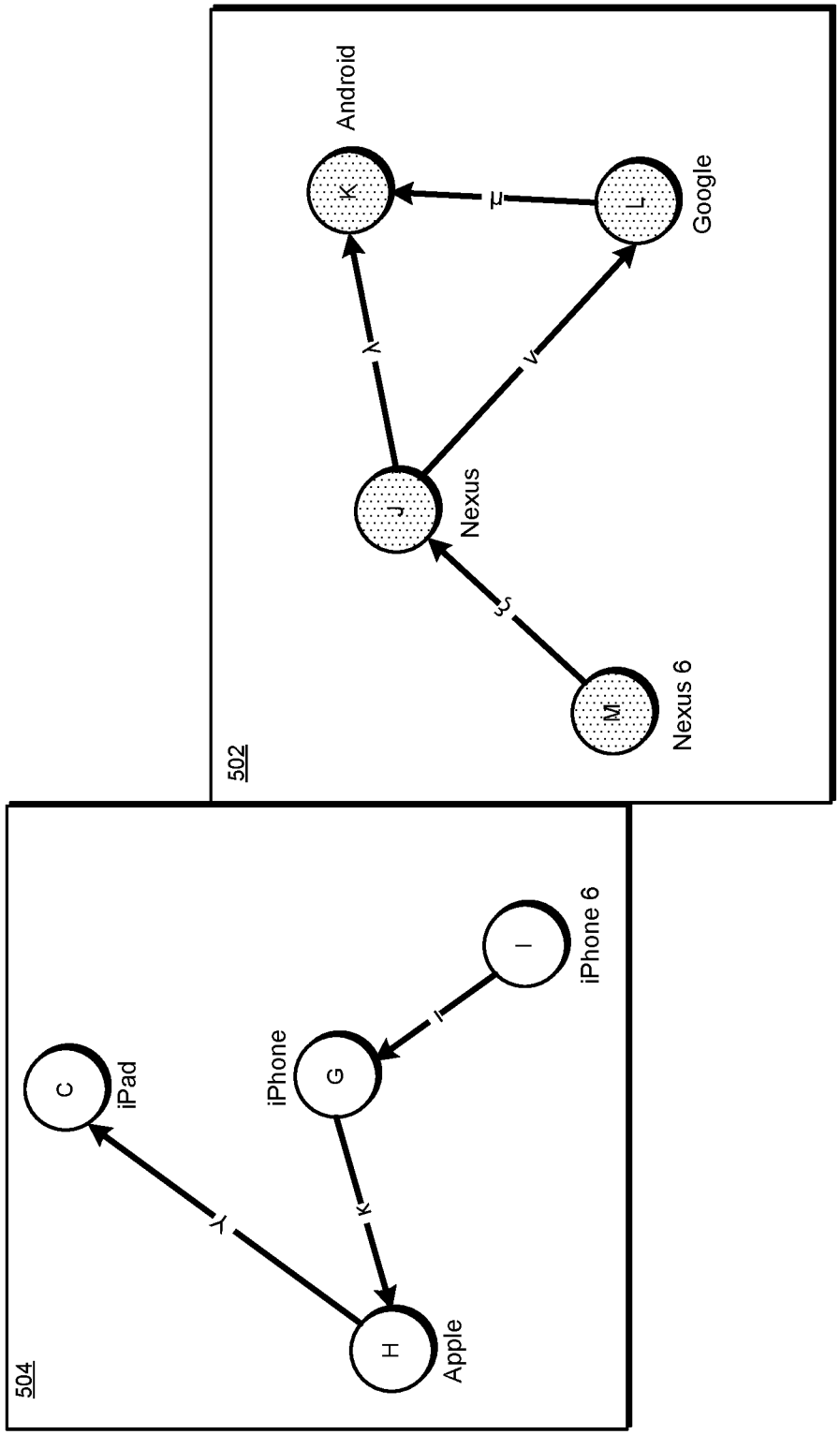
FIG. 5 depicts a graph of a reduced matrix in accordance with an illustrative embodiment.

With reference to FIG. 5, this figure depicts a graph of a reduced matrix in accordance with an illustrative embodiment. Subgraph 502 results from row 418 in FIG. 4. Subgraph 504 results from row 420 in FIG. 4.

Subgraph 502 forms a cluster relative to node M. Subgraph 504 forms a cluster relative to node I. By performing the matrix computations described herein, and starting from a pair of individual nodes, clusters 502 and 504 have been identified in graph 300 of FIG. 3, which were previously unknown or unidentifiable in graph 300. Cluster 502 includes nodes J, K, L, and M. Cluster 504 includes nodes C, G, H, and I.

Again, note that graph 300 is a very simple and limited graph only for the clarity of the description purposes. It should be appreciated that such identification of clusters in a graph of actual complexity of millions of nodes and edges is non-trivial. Furthermore, without the matrix computations of an embodiment, such clustering would be computationally very expensive as well.

Figure 6:
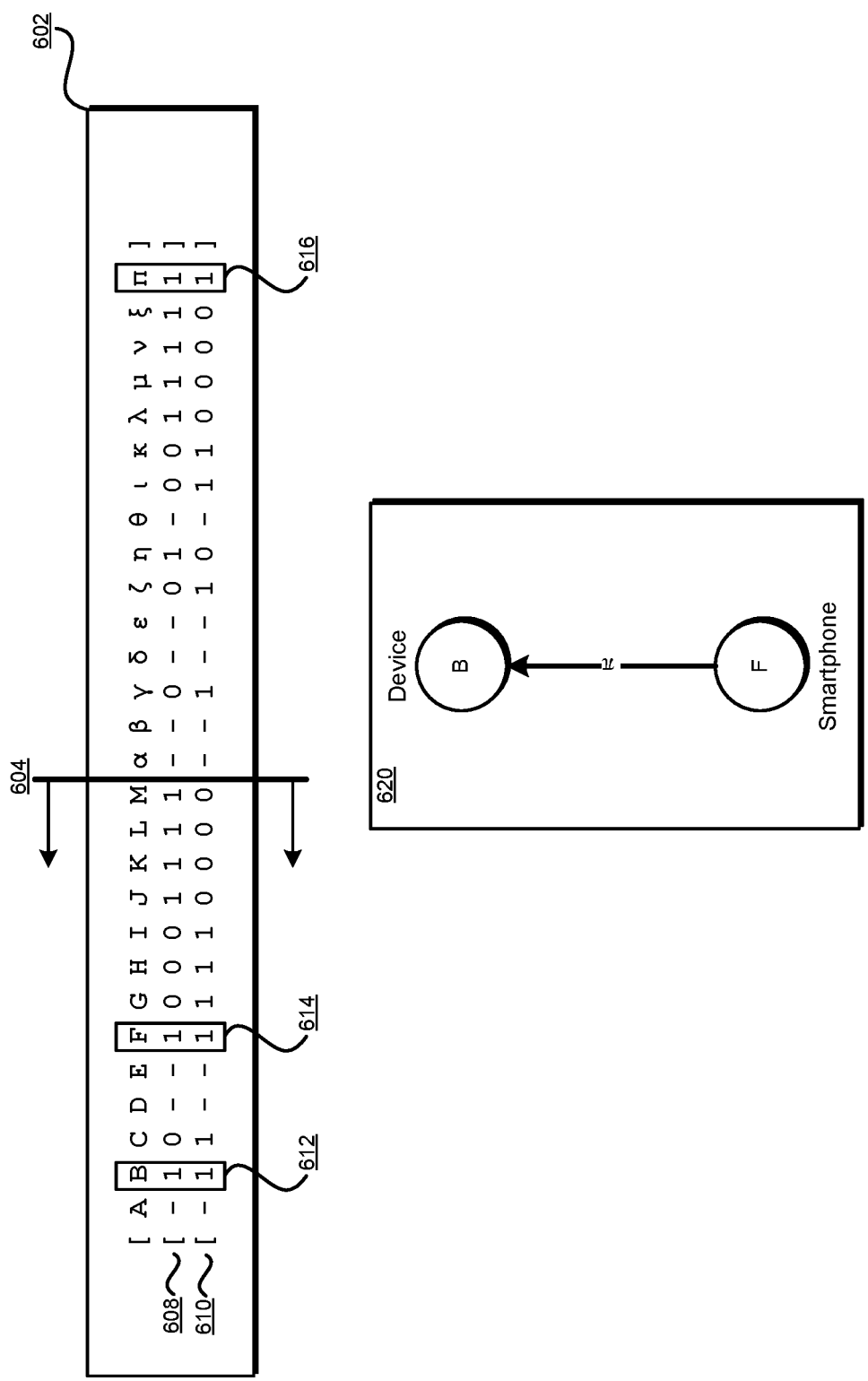
FIG. 6 depicts a relationship vector extracted for the clusters in accordance with an illustrative embodiment.

With reference to FIG. 6, this figure depicts a relationship vector extracted for the clusters in accordance with an illustrative embodiment. An embodiment computes matrix 602 from matrix 402 in FIG. 4.

The embodiment constructs matrix 602 from matrix 402 by identifying those columns where at least one of rows 408 and 410 has a non-zero value. In other words, matrix 602 ignores those columns where both rows 408 and 410 have "0" value.

Suppose, as a non-limiting example, the focus of the operation is to identify nodes, not edges, that somehow establish some relationship between the identified clusters of FIG. 5. In such a case, considering only columns A-M to the left of divider 604 in matrix 602, the embodiment identifies those columns where rows 608 and 610 both have a non-zero value. This operation identifies column B (612) and column F (614). Each of columns 612 and 614 forms a relationship vector between clusters 502 and 504.

Subgraph 620 represents the set of relationship vectors found in the above computation. Here, as another example, the edge columns are not ignored, and column π, which also has non-zero values in rows 608 and 610 is also represented as a relationship vector 616. Subgraph 620 shows node B "device" and node F "smartphone" being related to both clusters 502 and 504. Nodes B and F themselves are related to one another via vector 616 represented by edge π.

Figure 7:
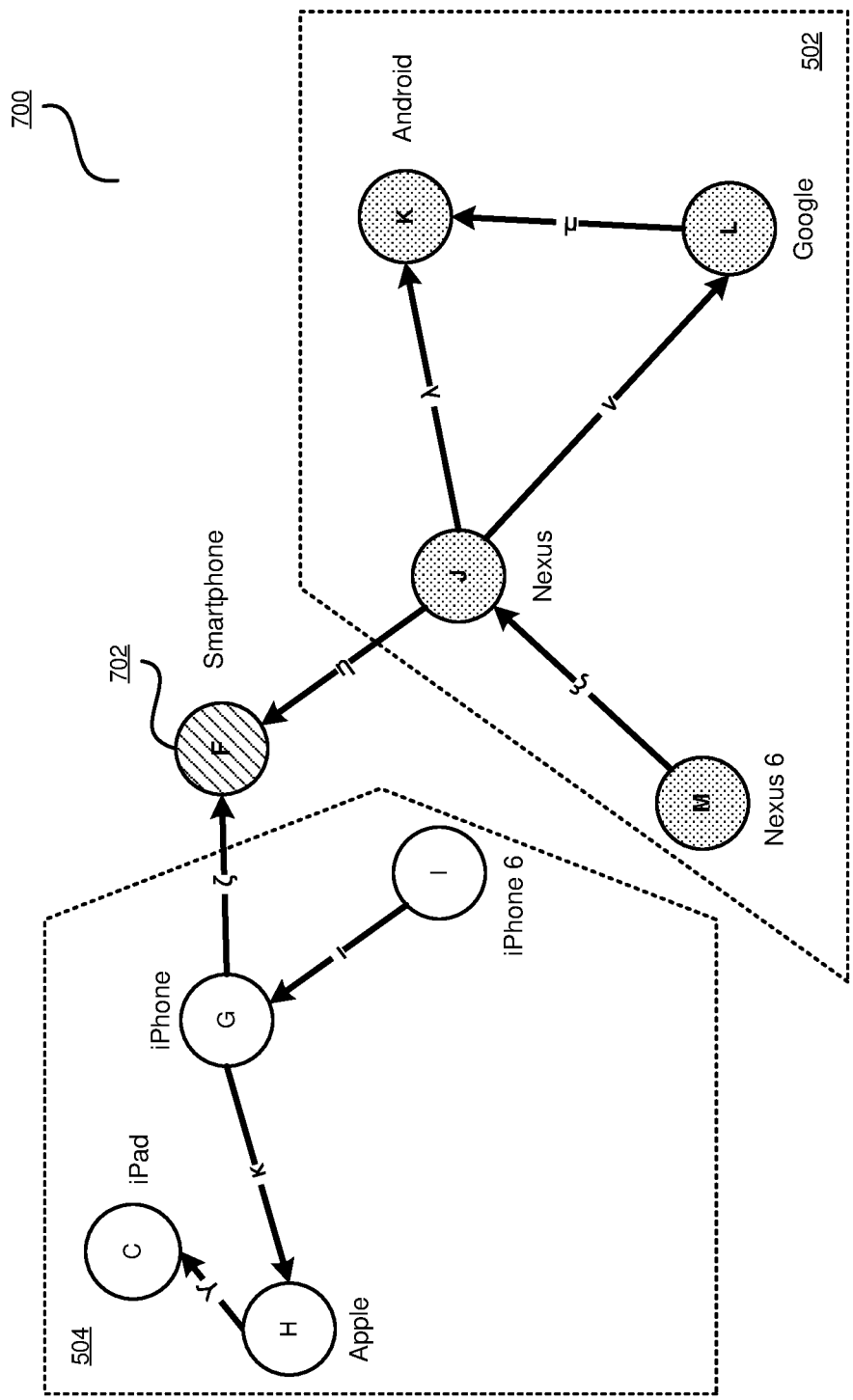
FIG. 7 depicts a precise relationship between the identified clusters in accordance with an illustrative embodiment.

With reference to FIG. 7, this figure depicts a precise relationship between the identified clusters in accordance with an illustrative embodiment. Precise cluster relationship graph 700 is formed using clusters 502 and 504 in FIG. 5, and by determining the most precise relationship from subgraph 620 in FIG. 6.

To determine the most accurate and precise vector, an embodiment leverages a next-in-sequence comparison. The result of this operation rules out vector 612, as the next-in-sequence is a vector already known to be on our list of candidates. The next in sequence for vector 614 are not in the candidate list. A larger vector list can be reduced in a similar manner. At this point in the computation, the embodiment is left with two nodes B and F.

In one embodiment, a known query execution demonstrates that F is a more precise form of B. I.e., a smartphone is a more precise form of a device.

Another embodiment examines the position of the candidate vectors in the set. As long as original graph 300 was a DAG, B can be reached from F but not vice versa. Therefore, the embodiment concludes that F is more precise than B.

Thus, node F (or relationship vector 614) is selected as the most precise of all candidate relationships between clusters 502 and 504. Accordingly, precise cluster relationship graph 700 shows clusters 502 and 504 most precisely related through node F (702). I.e., the analysis of the embodiment establishes that the group of people who use iPhone 6 and the group of people who use Nexus 6 are most precisely related in the given volume of data by the fact that both groups use smartphones.

Figure 8:
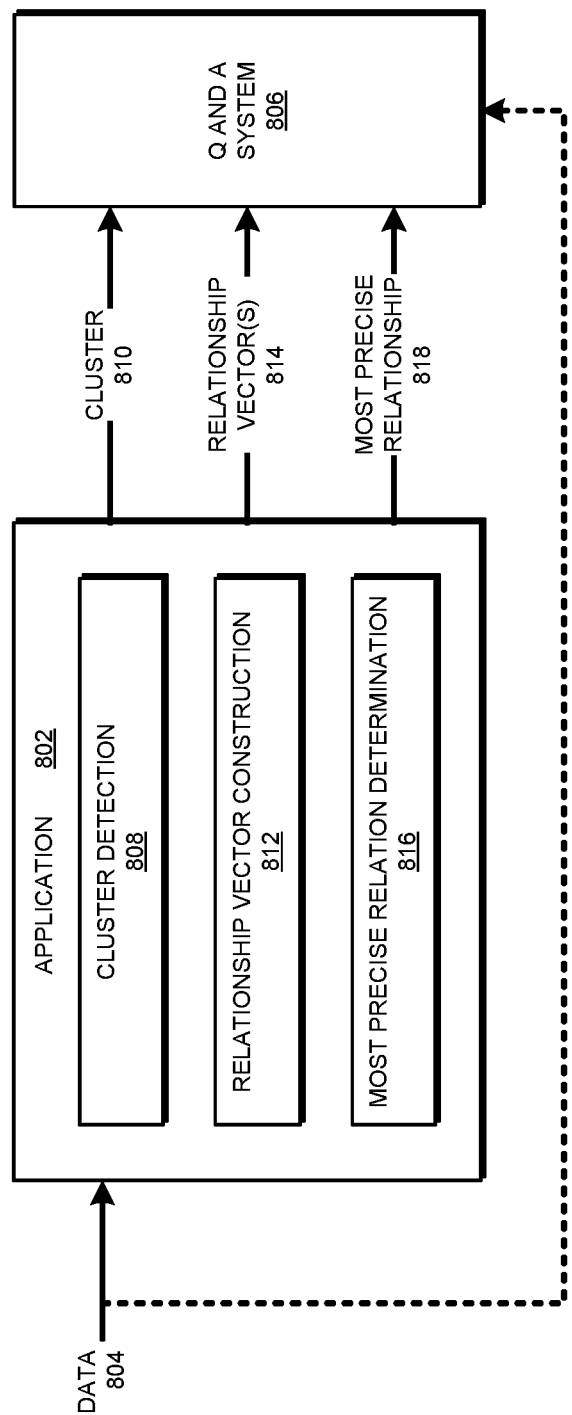
FIG. 8 depicts a block diagram of an example configuration for detecting clusters and relationships in large data sets in accordance with an illustrative embodiment.

With reference to FIG. 8, this figure depicts a block diagram of an example configuration for detecting clusters and relationships in large data sets in accordance with an illustrative embodiment. Application 802 is an example of application 105 in FIG. 1. Data 804, which forms an input to application 802, is an example of data 109 in FIG. 1. Q and A system 806 is an example of Q and A system 107 in FIG. 1.

Q and A system 806 is only an example consumer application of the outputs of application 802 and is not intended to be limiting. From this disclosure, those of ordinary skill in the art will be able to conceive many other applications that can use or consume the outputs of application 802, and the same are contemplated within the scope of the illustrative embodiments.

Component 808 detects one or more clusters that are present in data 804, such as clusters 502 and 504 in FIG. 5. Optionally, component 808 outputs information 810 descriptive of the detected clusters.

Component 812 constructs one or more relationship vectors between the clusters detected by component 808, such as vectors 612 and 614 in FIG. 6. Optionally, component 812 outputs information 814 descriptive of the relationship vectors.

Component 816 determines the most precise of the relationship vectors from the vectors constructed by component 812, such as vector 614, which represents node F (702) in FIG. 7. Optionally, component 816 outputs information 816 descriptive of the most precise relationship between the detected clusters.

Figure 9:
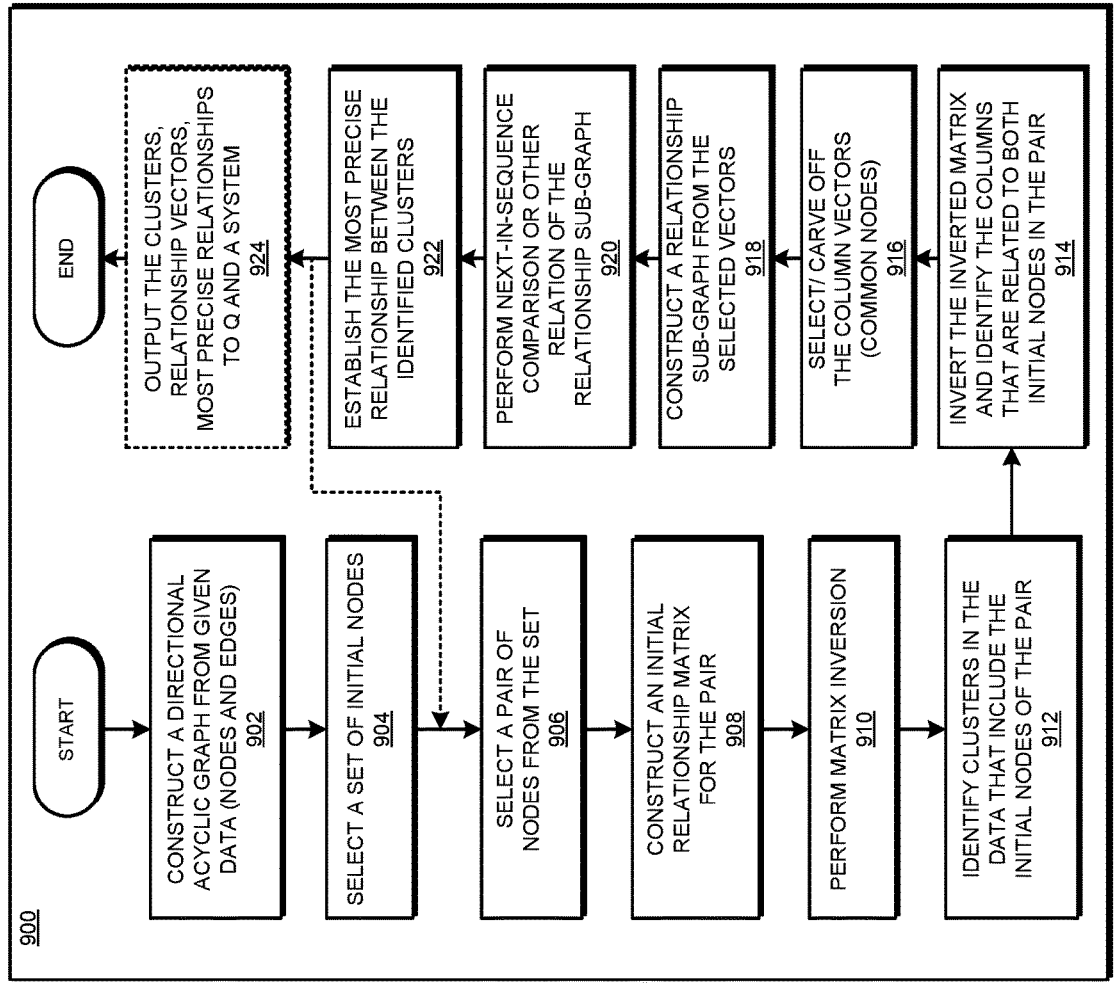
FIG. 9 depicts a flowchart of an example process for detecting clusters and relationships in large data sets in accordance with an illustrative embodiment.

With reference to FIG. 9, this figure depicts a flowchart of an example process for detecting clusters and relationships in large data sets in accordance with an illustrative embodiment. Process 900 can be implemented in application 802 in FIG. 8.

The application constructs a directional acyclic graph from a given volume of data (block 902). The application selects a set of initial nodes (block 904). The application selects a pair of nodes from the set of initial nodes (block 906).

The application constructs an initial relationship matrix for the pair of nodes (block 908). The application performs a matrix inversion on the initial relationship matrix (block 910).

The application identifies the nodes that are present in the inverted row corresponding to the initial node, and identifies those nodes as forming a cluster with the initial node corresponding to the row (block 912). The application inverts the inverted matrix and identifies those columns that are related to both the initial nodes in the pair of initial nodes (block 914).

The application carves off, or isolates, the identified columns as column vectors (block 916). From these column vectors, which represent relationships between the clusters identified in block 912, the application constructs a relationship subgraph (block 918). The application performs a reduction of the relationship subgraph by performing next-in-sequence comparison or by another method as described herein (block 920). The reduction establishes the most precise relationship, from the relationship vectors computed in block 916, between the clusters identified in block 912, (block 922).

If the set of initial nodes selected in block 904 included more than two initial nodes, the application returns process 900 to block 906 to select another pair of initial nodes. When all pairs of initial nodes have been processed, the application optionally outputs the detected clusters, the identified relationship vectors between various clusters, the most precise relationships between the various clusters, or some combination thereof, to a consumer application, such as to a Q and A system (block 924). The application ends process 900 thereafter.

Thus, a computer implemented method, system or apparatus, and computer program product are provided in the illustrative embodiments for detecting clusters and relationships in large data sets and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method performed by at least one computer processor executing computer program instructions stored on at least one computer-readable storage medium, the method comprising:

computing, by the at least one processor, from a directional acyclic graph (DAG) corresponding to a data volume, a matrix of relationships of a first node and a second node, the DAG comprising a set of nodes and a set of directional edges, the set of nodes including the first node and the second node;

constructing, by the at least one processor, as a part of the computing the matrix, a first row in the matrix representing a set of relationships of the first node with a subset of the nodes in the DAG, and a second row in the matrix representing a set of relationships of the second node with the subset of the nodes in the DAG, wherein a relationship between the first node and another node in the subset of nodes is indicative of whether the other node is reachable from the first node in the DAG;

computing, by the at least one processor, an inverted matrix from the matrix, wherein the inverted matrix retains values in only those column positions where a value in a first row corresponding to the first node is opposite of a value in a second row corresponding to the second node;

constructing, by the at least one processor, from the first row, a first cluster of nodes related to the first node, by selecting nodes corresponding to those columns where the first row has a value indicating an affirmative relationship;

outputting, by the at least one processor, information representing the first cluster of nodes related to the first node and information representing a second cluster of nodes related to the second node; and answering, by the at least one processor, a question pertaining to the data volume using pre-processed data instead of the data volume, wherein the pre-processed data is based at least in part on the information representing the first and second clusters, the pre-processed data including relationship information that includes information related to the affirmative relationship.

2. The method of claim 1, further comprising:
selecting a set of vectors from the matrix, wherein a vector in the set of vectors corresponds to a column in the matrix where the node corresponding to the column has a relationship with both the first node and the second node; and
outputting information representing each vector in the set of vectors.

3. The method of claim 2, further comprising:
reducing the set of vectors to a single vector, the single vector representing the most precise relationship between the first cluster and the second cluster.

4. The method of claim 3, further comprising:
performing, as a part of the reducing, a next-in-sequence comparison between a vector and other vectors in the set of vectors.

5. The method of claim 3, further comprising:
determining, as a part of the reducing, whether a third node corresponding to a first vector in the set of vectors is reachable from a fourth node corresponding to a second vector;
determining, as a part of the reducing, whether the fourth node corresponding to the second vector in the set of vectors is reachable from the third node corresponding to the first vector; and
concluding that the third node is a more precise relationship between the first cluster and the second cluster responsive to the fourth node being reachable from the third node but the third node not being reachable from the fourth node; and
outputting the third node as a precise relationship between the first cluster and the second cluster.

6. The method of claim 1, further comprising:
constructing, from the second row, the second cluster of nodes related to the second node, by selecting nodes corresponding to those columns where the second row has a value indicating an affirmative relationship.

7. The method of claim 1, further comprising:
constructing from the data volume, the DAG.

8. A computer usable program product comprising one or more computer-readable storage devices, and program instructions stored on at least one of the one or more storage devices, the stored program instructions including instructions for instructing at least one computer processor to perform steps corresponding to the program instructions, the program instructions comprising:
program instructions for instructing the at least one processor to compute, from a directional acyclic graph (DAG) corresponding to a data volume, a matrix of relationships of a first node and a second node, the DAG comprising a set of nodes and a set of directional edges, the set of nodes including the first node and the second node;
program instructions for instructing the at least one processor to construct, as a part of the computing the matrix, a first row in the matrix representing a set of relationships of the first node with a subset of the nodes in the DAG, and a second row in the matrix representing a set of relationships of the second node with the subset of the nodes in the DAG, wherein a relationship between the first node and another node in the subset of nodes is indicative of whether the other node is reachable from the first node in the DAG;
program instructions for instructing the at least one processor to compute an inverted matrix from the matrix, wherein the inverted matrix retains values in only those column positions where a value in a first row corresponding to the first node is opposite of a value in a second row corresponding to the second node;
program instructions for instructing the at least one processor to construct, from the first row, a first cluster of nodes related to the first node, by selecting nodes corresponding to those columns where the first row has a value indicating an affirmative relationship;
program instructions for instructing the at least one processor to output information representing the first cluster of nodes related to the first node and information representing a second cluster of nodes related to the second node; and
program instructions for answering, by the at least one processor, a question pertaining to the data volume using pre-processed data instead of the data volume, wherein the pre-processed data is based at least in part on the information representing the first and second clusters, the pre-processed data including relationship information that includes information related to the affirmative relationship.

9. The computer usable program product of claim 8, further comprising:
program instructions to select a set of vectors from the matrix, wherein a vector in the set of vectors corresponds to a column in the matrix where the node corresponding to the column has a relationship with both the first node and the second node; and
program instructions to output information representing each vector in the set of vectors.

10. The computer usable program product of claim 9, further comprising:
program instructions to reduce the set of vectors to a single vector, the single vector representing the most precise relationship between the first cluster and the second cluster.

11. The computer usable program product of claim 10, further comprising:
program instructions to perform, as a part of the reducing, a next-in-sequence comparison between a vector and other vectors in the set of vectors.

12. The computer usable program product of claim 10, further comprising:
program instructions to determine, as a part of the reducing, whether a third node corresponding to a first vector in the set of vectors is reachable from a fourth node corresponding to a second vector;
program instructions to determine, as a part of the reducing, whether the fourth node corresponding to the second vector in the set of vectors is reachable from the third node corresponding to the first vector; and
program instructions to conclude that the third node is a more precise relationship between the first cluster and the second cluster responsive to the fourth node being reachable from the third node but the third node not being reachable from the fourth node; and
program instructions to output the third node as a precise relationship between the first cluster and the second cluster.

13. The computer usable program product of claim 8, further comprising:

program instructions to construct, from the second row, the second cluster of nodes related to the second node, by selecting nodes corresponding to those columns where the second row has a value indicating an affirmative relationship.

14. The computer usable program product of claim 8, further comprising:
program instructions to construct from the data volume, the DAG.

15. The computer usable program product of claim 8, wherein the computer usable code is stored in a computer readable storage device in a data processing system, and wherein the computer usable code is transferred over a network from a remote data processing system.

16. The computer usable program product of claim 8, wherein the computer usable code is stored in a computer readable storage device in a server data processing system, and wherein the computer usable code is downloaded over a network to a remote data processing system for use in a computer readable storage device associated with the remote data processing system.

17. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
program instructions for instructing the at least one of the one or more processors to compute, from a directional acyclic graph (DAG) corresponding to a data volume to compute, from a directional acyclic graph (DAG) corresponding to a data volume, a matrix of relationships of a first node and a second node, the DAG comprising a set of nodes and a set of directional edges, the set of nodes including the first node and the second node;
program instructions for instructing the at least one of the one or more processors to construct, as a part of the computing the matrix, a first row in the matrix representing a set of relationships of the first node with a subset of the nodes in the DAG, and a second row in the matrix representing a set of relationships of the second node with the subset of the nodes in the DAG, wherein a relationship between the first node and another node in the subset of nodes is indicative of whether the other node is reachable from the first node in the DAG;
program instructions for instructing the at least one of the one or more processors to compute an inverted matrix from the matrix, wherein the inverted matrix retains values in only those column positions where a value in a first row corresponding to the first node is opposite of a value in a second row corresponding to the second node;
program instructions for instructing the at least one of the one or more processors to construct, from the first row, a first cluster of nodes related to the first node, by selecting nodes corresponding to those columns where the first row has a value indicating an affirmative relationship;
program instructions for instructing the at least one of the one or more processors to output information representing the first cluster of nodes related to the first node and information representing a second cluster of nodes related to the second node; and
program instructions for instructing the at least one of the one or more processors to answer a question pertaining to the data volume using pre-processed data instead of the data volume, wherein the pre-processed data is based at least in part on the information representing the first and second clusters, the pre-processed data including relationship information that includes information related to the affirmative relationship.

18. The computer system of claim 17, further comprising:
program instructions to select a set of vectors from the matrix, wherein a vector in the set of vectors corresponds to a column in the matrix where the node corresponding to the column has a relationship with both the first node and the second node; and
program instructions to output information representing each vector in the set of vectors.

\* \* \* \* \*